Jan. 20, 1970  G. LEROY  3,490,732
PRESSURE PROGRAMMED CHECK VALVE
Filed Feb. 24, 1967  2 Sheets-Sheet 1
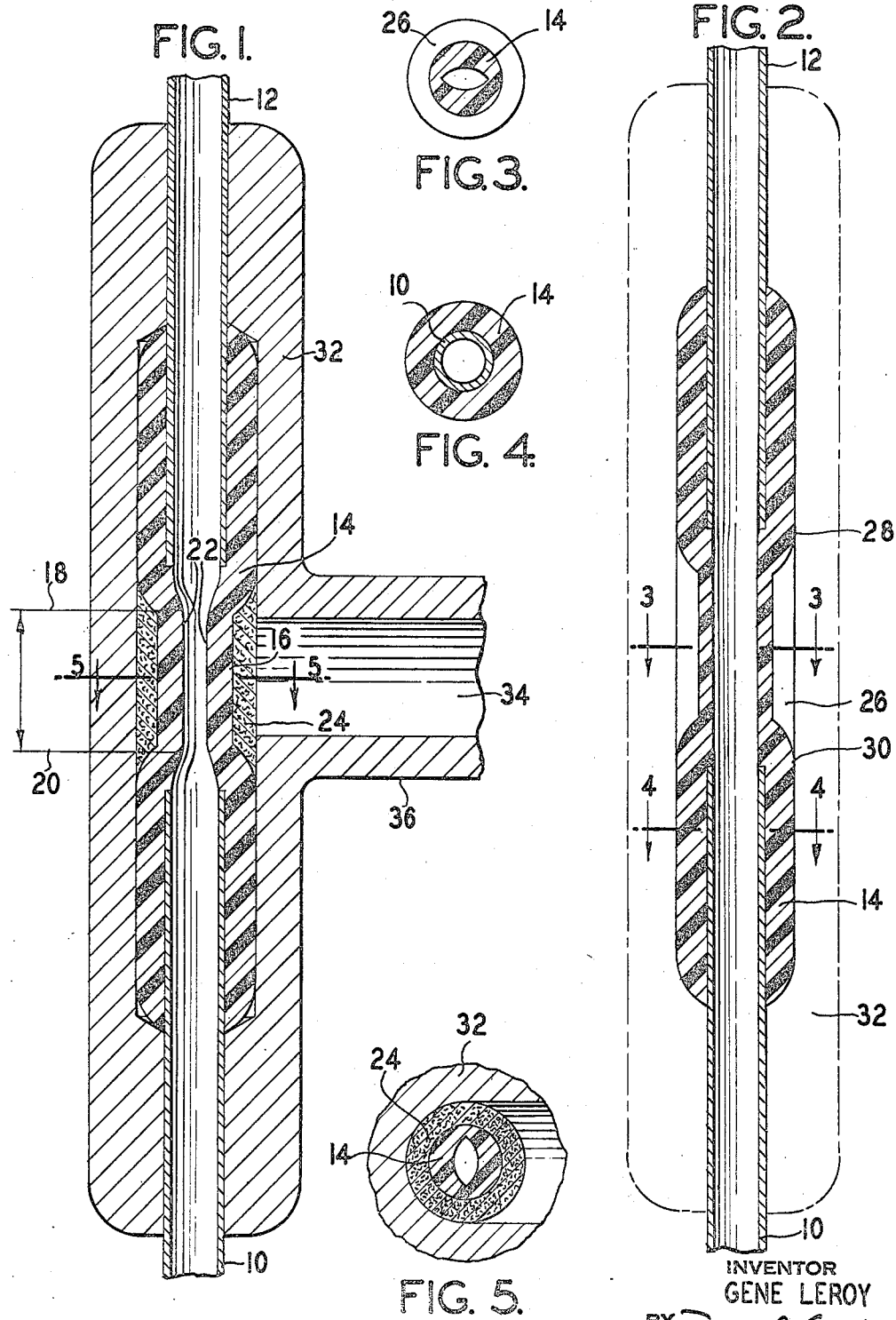
INVENTOR
GENE LEROY
BY Robert J Eichelberg
ATTORNEY

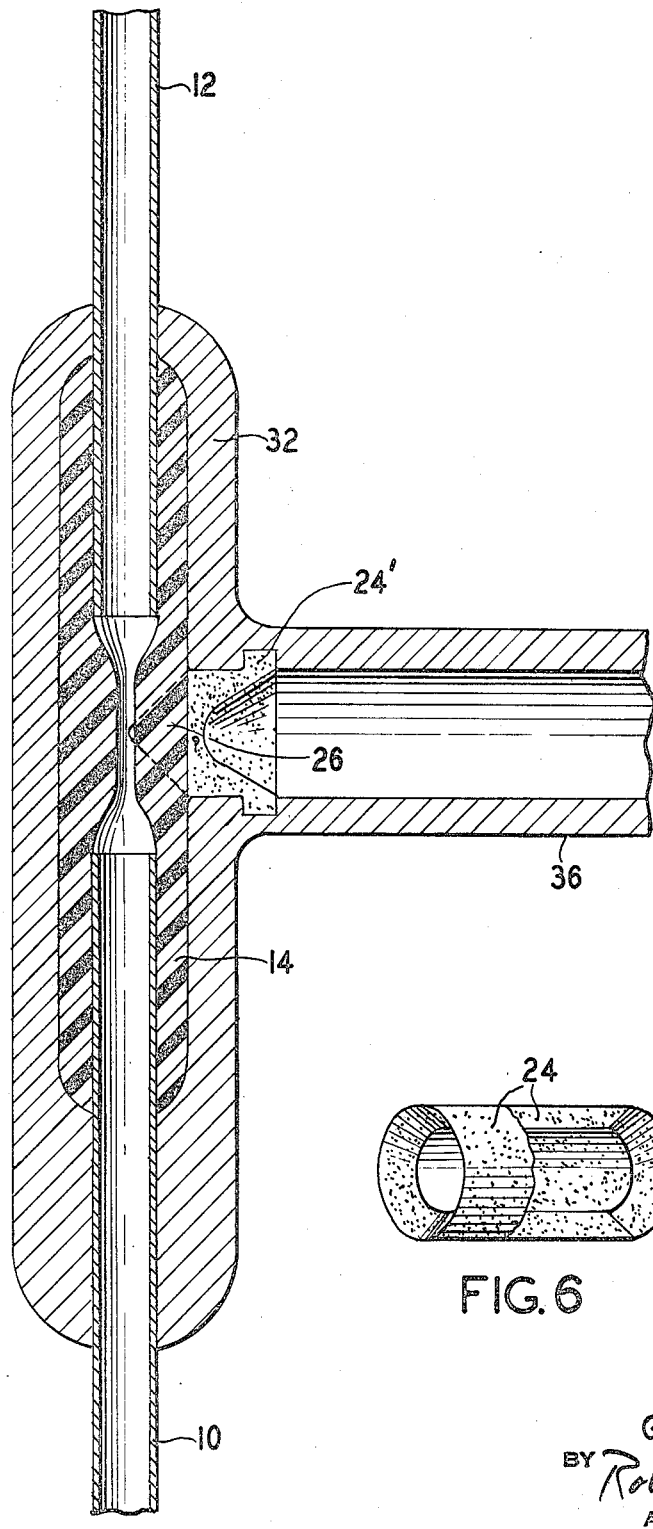

United States Patent Office 3,490,732
Patented Jan. 20, 1970

---

3,490,732
PRESSURE PROGRAMMED CHECK VALVE
Gene Leroy, Scott Depot, W. Va., assignor to Union
Carbide Corporation, a corporation of New York
Filed Feb. 24, 1967, Ser. No. 618,436
Int. Cl. F16l *55/14;* F16k *15/14*
U.S. Cl. 251—5                                  10 Claims

ABSTRACT OF THE DISCLOSURE

A valve is provided comprising a hollow casing and a collapsible bladder within the casing. The casing is provided with inlet and outlet conduits for passage of a fluid around the bladder. The bladder is provided with an inlet conduit for inflating the bladder to control or halt the passage of fluid through the valve. The bladder may be packed with a solid fluid permeable reinforcing member to prevent fluid passing through the valve from deforming the bladder.

---

The present invention relates to a pressure programmed check valve for regulating the flow of materials such as a flowable solid, fluids or dispersions of and/or slurries of solids in fluid through conduits. The valve of this invention is especially suitable for regulating the flow of slurries through conduits.

Conventional check valves in fluid systems are intended to insure that flow occurs in only one direction through the fluid conduit. This is normally accomplished by means of spring loaded balls or poppets which impinge against machined seats. When fluid pressure in the direction of desired flow exceeds the spring force, the valves unseat and flow occurs.

While valves of this type have found wide use they are considered unsatisfactry in many applications. One major disadvantage of the so called ball-check valves or poppet check valve is the lack of control over the valve opening or closing mechanism after installation in a fluid conductor or conduit. Some measure of control may be obtained through regulation of the pressure of the fluid passing through the valve as well as a selection of check spring tension or resilient means which mechanically control over the valve opening and closing action is fixed is effective although limited in that the degree of control over the valve opening and closing action is fixed upon installation of the valve. Stated otherwise there is no external control that may be exerted upon the valve system but for the regulation of the pressure of the fluid in the conduit containing the valve once the valve has been installed. Although systems of this type have wide applicability, their use is restricted to those applications in which the operation of the valve is controlled or may be controlled by the line pressure. Valve systems of this type are not generally suitable in those applications where little if any control over line pressure is possible, or where line pressure fluctuates as a system variable. One of the most notable deficiencies in valve systems of this type is that they operate only in unidirectional systems. Metered fluid control in both directions is essentially impossible with ball valves or poppet valves of this type. Difficulties of this type however may be overcome by the installation of valve by-pass having a similar valve operating in an opposite direction in the by-pass. However this involves the use of at least two valves in the system which represents additional expense in terms of duplication of apparatus as well as installation costs.

Additionally valves of these types are also unsatisfactory in applications involving slurries or suspensions or dispersions of solids in fluids such as liquids or gases. Use of valves of these types in solid systems are beset by operating difficulties caused by the deposition of solids on the machined surfaces of the valve seats or in the valve stem and valve stem guiding means which prevents proper opening and closing or seating of the valve.

It is therefore an object of the present invention to overcome these and other difficulties encountered in the prior art. It is a specific object of this invention to provide a check valve that may be operated by control of either the presure in the conduit in which the valve is installed as well as by flow restricting means which are externally controlled. It is a further object of this invention to provide a check valve or valve means that is equally operable in two directions.

These and other objects have been achieved by the apparatus of the present invention comprising a pressure programmed check valve which may be further understood by reference to:

FIGURE 1 which illustrates a completed valve assembly;

FIGURE 2 which illustrates a cross sectional view, a collapsible bladder fitted onto conduit means;

FIGURE 3 which illustrates a cross section of FIGURE 2 taken along the line 3—3;

FIGURE 4 which illustrates a cross section of FIGURE 2 taken along the line 4—4;

FIGURE 5 which illustrates a cross section of FIGURE 1 taken along the line 5—5;

FIGURE 6 which shows a preferred embodiment of a porous sleeve comprising a split porous metal sleeve used in the present invention; and FIGURE 7 which shows an alternate embodiment of FIGURE 1.

The novel valve assembly of the present invention may be further understood by reference to FIG. 1 in which a completed valve assembly is shown comprising conduits 10 and 12 leading into and associated with collapsible bladder 14 in a fluid tight sealing relationship. Collapsible bladder 14 may be adhered or sealed to conduits 10 and 12 by means of adhesives well known in the art or by one or a plurality of constrictable collars placed around those portions of bladder 14 which engage conduits 10 and 12.

Collapsible bladder 14 may be constructed of any material, preferably a polymeric material, that will constrict or expand when pressure is applied to wall 16, the bladder being sufficiently and preferably deformable to such a degree that when sufficient pressure is applied, the portion of the bladder 18–20 will constrict so that the inner surface 22 will collapse in on itself and form continuous fluid impassable contiguous surfaces along the section 18–20.

The collapsible bladder 14 may be constructed of a polymeric material, which is empirically observed to be suitable for the conditions of pressure, temperature, pH, exerted by the fluid passed through conduits 10 and 12. Collapsible bbladder 14 preferably however is constructed from a polymer such as poly(fluoroethylene) ["Teflon"] or materials comprising an elastomeric material such as natural rubber or synthetic rubber. Natural rubber that may be used in this regard comprises that obtained from the plant species *Hevea manihot glaziivoii, Castilloa elastica, Ficus elastica,* Landolphia and *Parthenium argentatum.* Synthetic rubbers may also be used and generally are preferred because of the broad range of properties that may be built into or blended into rubbers of this nature. Synthetic rubber polymers that may be used in this regard comprise GR-S (butadiene-styrene), Buna S-1, Buna S-3 (butadiene-styrene copolymers); butyl rubber (isobutylene, isobutylene-isoprene and isobutylene-butadiene polymers and copolymers); Buna N (butadiene-acrylonitrile copolymers); Thiokol or polysulfide type rubbers made by the reaction of sodium polysulfide and alkylene polyhalides. Thiokol type polymers of this type generally are classified as the type A thiokols made by the reaction of sodium polysulfide and ethylene dichloride, type FA made by the reaction of sodium polysulfide, ethylene dichloride and di(chloroethyl)-formal; type ST made by the reaction of sodium polysulfide and di(chloroethyl)formal, type PR–1 made by the reaction of sodium polysulfide and ethylene dichloride and di(chloroethyl)formal and the LP–2, –3, –8 types obtained by reacting sodium polysulfide and di(chloroethyl)formal (98%) and trichloropropane (2%). Silicon rubbers may also be used for the flow restricting means or collapsible bladder 14 and are especially suitable for low temperature operations or in those applications where corrosion resistance is a requisite to successful operation of the valve. Generally the silicon rubbers suitable in this regard comprise polymers of purified dimethylsiloxane having linear chains of several thousand repeating molecular units. The flow restricting means or collapsible bladder 14 may also be made from acrylic rubbers for example polymers of acrylic acid esters from alcohols of intermediate molecular weight such as the ethyl and butyl esters of acrylic and methacrylic acid. Copolymers of these acrylic acid esters with chloroethyl vinyl ether and/or with acrylonitrile are also suitable. Isocyanate type rubbers may also be used in this regard and are made by the condensation of a diols such as butane diol or ethylene glycol or alternately a low molecular weight polyester condensate of adipic acid and such diols reacted with a polyisocyanate such as diisocyanates including tolylene diisocyanate and equivalents all of which are well known in the art. Chlorinated polyethylenes may also be used such as those prepared by the reaction of polyethylene with chlorine and sulfur and dioxide.

Polyethylenes treated in such a fashion contain sulfonyl chloride groups along the polymer chain. Collapsible tube 14 may also be fabricated from plasticized or unplasticized vinylidene chloride, vinyl chloride, polymers or copolymers such as vinyl chloride vinyl acetate copolymers. Copolymers of butadiene and vinyl pyridine or the perfluoroalkyl acrylates are also suitable in this respect. Collapsible tube 14 may also be fabricated from metals such as ferrous alloys, e.g. stainless steel and the like.

A pressure chamber 26 of FIG. 2 comprises the inner volume of a bladder formed by placing collapsible bladder 14 in hollow casing 32 which sealingly engages collapsible bladder 14 at sections 28 and 30. Hollow casing means 32 also sealingly engages conduits 10 and 12 in a fluid tight relationship in the same manner as pressure chamber 26 at sections 28 and 30. Thus pressure chamber 26 of the bladder formed is substantially a toroidal configuration. Pressure chamber 26 also contains an aperture 34 through which fluids either under pressure or vacuum may be introduced into chamber 26. Aperture 34 may contain a plug of the same or different material as that used in porous means 24 either in addition to porous means 24 or in lieu thereof. Toroid bladders may also be used in the apparatus of the present invention in which the entire bladder is made as a unit and placed within casing 32. Additionally non-toroid shaped bladders may be inserted in casing 32 with bladder retaining means wherein a portion of the inner wall of casing 32 forms one wall of the bladder or alternately a three dimensional closed hollow bladder may be placed in casing 32 such as hollow sphere, dome, cone, frusto-cone, oblate spheroid, prolate spheroid or an aerodynamic configuration such as tear-shaped sphere or the like. It is essential to the invention however, that the bladder has external conduit means such as a vent in the wall of casing 32 that comprises one wall of a toroid bladder or equivalent or a tube leading into the bladder that may be connected to an external pressure source. These equivalent bladders described above may also be made of the same materials as collapsible tube 14.

Preferably a collar 24 is placed next adjacent section 18–20 of collapsible bladder 14. The collar is a porous material which preferentially surrounds the section 18–20 however may comprise a strip or a block of porous material adjacent or next adjacent outer wall 16 in zone 18–20, when said outer wall 16 in zone 18–20 is surrounded by chamber 26 (as shown in FIG. 2) sealed to collapsible bladder 14 at 28 and 30.

Porous means 24 may comprise a porous bronze metal split sleeve or any other porous metal made by the powder metallurgy technique including porous brass, porous iron, porous steel and the like. Equivalent materials comprise compressed metal screening, fiber packing, said fibers comprising either synthetic or natural fibers well known in the art or may comprise annularly wound screening or monofilament windings also known in the art. Porous ceramic materials may also be employed for means 24. Where porous means 24 does not have sufficient strength to withstand the pressure transmitted from inner wall 22 to outer wall 16 reinforcing material may be used in the packing 24. Loose pulverulent material may also be used for means 24. In lieu of reinforcing porous means 24 or in lieu of means 24 per se sufficient pressure may be introduced into chamber 26 through opening 34 to prevent any outward displacement of wall 16. Additionally plug means in opening 34 previously mentioned may also be formed of the same material and used as porous means 24 and may also comprise a screen such as a stainless steel screen or a plurality of screens, a perforated disc or a plurality of perforated discs.

During the operation of the valve assembly as shown in FIGS. 1, 2, 3, 4, 5, 6 and 7 a fluid may be passed in either direction through conduits 10 and/or 12 including a solid suspended in a fluid and as fluid passes in contact with walls 22 in zone 18–20 a second fluid at the same or different e.g. higher pressures may be introduced through opening 34 via conduit 36 into pressure chamber 26 which preferably contains a porous sleeve 24 or equivalent thereof. When the fluid under pressure in conduit 36 and chamber 26 exceeds that in conduits 10 and 12 pressure is brought to bear on outer wall 16 of flow restricting means 14 causing it to "pinch" together so that inner walls 22 in zone 18–20 abut against one another in a pressure tight sealing relationship when the pressure in line 36 sufficiently exceeds that in conduits 10 and 12. The pressure in conduit 36 may be a static source of pressure such as a gas cylinder or an accumulator. Additionally conduit 36 may be connected to either conduit 10 and/or 12 so that the line pressure from the main conduits may be used in regulator conduit 36 to assure that the internal pressure and external pressure on walls 22 and 16 respectively may always remain in a state of equilibrium or alternately line pressure from conduits 10 or 12 may be used to regulate the constriction of regulator means 14 assuring that the effluent end of zone 18–20 will always contain fluids passing therethrough at substantially the same volume even though there may be surges or pressure differentials in either line 10 or 12. This may be accomplished by tapping into conduits 10 or 12 with conduit 36 at a "tap point" so that the length of conduit 36 between the "tap point" and valve assembly is shorter than the length of conduit 10 or 12 from the "tap point" to the valve assembly.

Thus regulator conduit 36 may be placed sufficiently afar upstream of the direction of flow in conduits 10 and 12 and may be of sufficient length so that regulator conduit 36 can be used to anticipate changes in the pressure in conduits 10 or 12 so as to either partially open or close or fully open or close the valve far in advance of such change reaching the valve thereby assuring a constant flow or volume of fluid from the effluent portion of the valve assembly.

In addition conduit 36 may also be connected to an external pressure source so as to seal off zone 18–20 as previously described, i.e. in addition to conduit 36 leading into either conduits 10 or 12, regulator conduit 36 may additionally be connected to another source of fluid pressure.

The valve assembly of the present invention may be used to meter slurries of catalytic solids in a fluid to a catalytic reaction zone under pressure. Additionally the valve may be used in spray guns in which a plurality of reactive ingredients are combined in the nozzle thereof or other appropriate mixing chamber so as to form a polymeric material such as polyurethanes, the reactants of which are well known in the art. Use of the valves of this type in such spray guns assures precise metering of reactive components such as polyols and polyisocyanates.

Additionally the valve assembly of the present invention may be used as a check valve by employing an external source of pressure in conduit 36 at sufficiently high pressures so that any pressure drop in conduits 10 or 12 which might result in a back flow through the valve would be instantly cut off. Furthermore when operating as a check valve, pressure conduit 36 can be operated to carry fluids under pressure sufficient to prevent any fluid from passing through section 18–20 of said valve unless the pressure was sufficiently higher than that in regulator conduit 36. Where a pressure differential between conduits 10 and 12 exist when the valve is used in a system, the flow in the direction of the pressure drop will be constrained or halted if the pressure in regulator conduit 36 is sufficiently higher than the highest pressure in either conduit 10 or conduit 12.

An additional application for the valve of the present invention comprises its use as a throttle valve by which a fluid may be introduced into regulator conduit 36 over a wide or variable range of pressures controlled by means well known in the art so that the constriction of inner walls 22 in zone 18–20 may be precisely controlled.

Although the invention has been described by reference to certain preferred embodiments, it is not intended that the novel apparatus be limited thereby but the true nature and scope of the invention is to be found within the spirit and broad scope of the following claims.

What is claimed is:

1. A valve comprising effluent and influent ported hollow casing means and mounted in said casing means bladder means for controlling the volume in said casing means, said bladder abutted by a rigid fluid porous means, and fluid conduit means leading into said bladder means.

2. The apparatus of claim 1 where said bladder comprises a pressure deformable wall peripherally sealed to the inner wall of said casing.

3. The apparatus of claim 2 where said bladder comprises a pressure deformable tubular means, the ends of said tubular means being peripherally sealed to the inner wall of said casing to form a toroidal bladder means, one wall of said bladder comprising the inner wall of said casing means and the other wall of said bladder comprising the outer wall of said tubular means.

4. A valve comprising effluent and influent ported hollow casing means and mounted in said casing means bladder means for controlling the volume in said casing means and fluid conduit means leading into said bladder means, said conduit means being plugged with rigid fluid permeable means abutting said bladder.

5. The apparatus of claim 4 where said bladder comprises a pressure deformable wall peripherally sealed to the inner wall of said casing.

6. The apparatus of claim 5 where said bladder comprises a pressure deformable tubular means, the ends of said tubular means being peripherally sealed to the inner wall of said casing to form a toroidal bladder means, one wall of said bladder comprising the inner wall of said casing means and the other wall of said bladder comprising the outer wall of said tubular means.

7. The apparatus of any one of the claims 1–6 wherein said rigid fluid permeable means comprises a rigid porous metal member.

8. The apparatus of any one of the foregoing claims 1–6 inclusive wherein said rigid fluid permeable means comprises a rigid porous ceramic member.

9. The apparatus of any one of the foregoing claims 1–6 inclusive where said bladder is fabricated from an elastomer.

10. The apparatus of any one of the foregoing claims 1–6 inclusive where said bladder is fabricated from a poly(fluoroethylene).

References Cited

UNITED STATES PATENTS

| | | | |
|---|---|---|---|
| 2,735,642 | 2/1956 | Norman | 251—5 |
| 2,895,505 | 7/1959 | Bachus | 251—5 X |
| 2,939,672 | 6/1960 | Rich | 251—5 |
| 2,972,464 | 2/1961 | Jones et al. | 251—5 |
| 3,007,416 | 11/1961 | Childs. | |

NATHAN L. MINTZ, Primary Examiner